United States Patent
Stimm et al.

(10) Patent No.: US 12,519,917 B2
(45) Date of Patent: *Jan. 6, 2026

(54) SYSTEMS AND METHODS FOR STABILIZING VIEWS OF VIDEOS

(71) Applicant: GoPro, Inc., San Mateo, CA (US)

(72) Inventors: Daryl Stimm, Encinitas, CA (US); William Edward MacDonald, San Mateo, CA (US); Kyler William Schwartz, Valley Center, CA (US)

(73) Assignee: GoPro, Inc., San Mateo, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 18/460,390

(22) Filed: Sep. 1, 2023

(65) Prior Publication Data

US 2023/0412788 A1 Dec. 21, 2023

Related U.S. Application Data

(63) Continuation of application No. 17/361,070, filed on Jun. 28, 2021, now Pat. No. 11,750,790, which is a continuation of application No. 16/878,075, filed on May 19, 2020, now Pat. No. 11,064,181, which is a continuation of application No. 16/047,472, filed on Jul. 27, 2018, now Pat. No. 10,681,332.

(51) Int. Cl.
*H04N 13/167* (2018.01)
*H04N 13/117* (2018.01)

(52) U.S. Cl.
CPC ......... *H04N 13/167* (2018.05); *H04N 13/117* (2018.05)

(58) Field of Classification Search
CPC ........... H04N 21/47205; H04N 13/117; H04N 13/144; H04N 13/207; H04N 13/221; H04N 13/344; H04N 13/366; H04N 13/373; H04N 13/376; H04N 13/378; H04N 13/38; H04N 2213/002; H04N 5/23238; H04N 21/854; H04N 5/23267; H04N 5/23264; H04N 5/23248; H04N 5/23254; H04N 5/23251; H04N 13/167; G06F 3/012; G06T 15/20
USPC .............................. 348/37, 39, 208.4, 208.13
See application file for complete search history.

(56) References Cited

U.S. PATENT DOCUMENTS 9,922,398 B1 * 3/2018 Jenny ........................ G06T 7/20
10,084,962 B2 9/2018 Kokaram
10,097,759 B1 * 10/2018 Motta .................. H04N 23/683

(Continued)

OTHER PUBLICATIONS

Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180. (Year: 2011).

(Continued)

*Primary Examiner* — Nathnael Aynalem
(74) *Attorney, Agent, or Firm* — Esplin & Associates, PC

(57) ABSTRACT

A viewing direction may define an angle/visual portion of a spherical video at which a viewing window is directed. A trajectory of viewing direction may include changes in viewing directions for playback of spherical video. Abrupt changes in the viewing directions may result in jerky or shaky views of the spherical video. Changes in the viewing directions may be stabilized to provide stabilized views of the spherical video. Amount of stabilization may be limited by a margin constraint.

20 Claims, 9 Drawing Sheets

(56) References Cited

U.S. PATENT DOCUMENTS

| | | |
|---|---|---|
| 10,681,332 B1 | 6/2020 | Stimm |
| 11,064,181 B2 | 7/2021 | Stimm |
| 11,750,790 B2 | 9/2023 | Stimm |
| 2013/0127988 A1 | 5/2013 | Wang |
| 2016/0253795 A1 | 9/2016 | Cole |
| 2016/0313734 A1 | 10/2016 | Enke |
| 2018/0063440 A1 | 3/2018 | Kopf |
| 2018/0234669 A1 | 8/2018 | Chen |
| 2018/0332267 A1 | 11/2018 | Hesla |
| 2019/0273902 A1 | 9/2019 | Varekamp |
| 2019/0289274 A1 | 9/2019 | Jenny |
| 2020/0351485 A1 | 11/2020 | Stimm |
| 2021/0329215 A1 | 10/2021 | Stimm |

OTHER PUBLICATIONS

Kopf "360 video stabilization: A new algorithm for smoother 360 video viewing" Aug. 31, 2016, Facebook Engineering (Year: 2016) (4 pages).

\* cited by examiner

SYSTEMS AND METHODS FOR STABILIZING VIEWS OF VIDEOS

FIELD

This disclosure relates to stabilizing views of videos by stabilizing changes in viewing directions.

BACKGROUND

Viewing directions for a video may include abrupt changes that result in a jerky/shaky view of the video. Such views of the video may decrease the enjoyability of viewing the video.

SUMMARY

This disclosure relates to stabilizing views of videos. Video information, viewing information for the spherical video content, margin information, and/or other information may be obtained. The video information may define spherical video content. The spherical video content may have a progress length and include spherical video frames that define visual content viewable from a point of view as a function of progress through the progress length. The viewing information for the spherical video content may define a trajectory of viewing directions for the spherical video content. The trajectory of viewing direction may include viewing directions from the point of view as the function of progress through the progress length. The margin information may define a margin constraint that limits deviations from the trajectory of viewing directions. Stabilized viewing information may be determined based on the viewing information, the margin information, and/or other information. The stabilized viewing information may define a stabilized trajectory of viewing directions for the spherical video content. The stabilized trajectory of viewing directions may include stabilized viewing directions from the point of view as the function of progress through the progress length. Differences between the trajectory of viewing directions and the stabilized trajectory of viewing directions may be limited by the margin constraint and/or other information. The spherical video content may be presented on a display based on the stabilized viewing information and/or other information.

A system that stabilizes views of videos may include one or more electronic storages, one or more processors, and/or other components. An electronic storage may store video information, information relating to video content, viewing information, information relating to viewing directions, margin information, information relating to margin constraint, stabilized viewing information, information relating to stabilized viewing directions, and/or other information.

The processor(s) may be configured by machine-readable instructions. Executing the machine-readable instructions may cause the processor(s) to facilitate stabilizing views of videos. The machine-readable instructions may include one or more computer program components. The computer program components may include one or more of a video information component, a viewing information component, a margin information component, a stabilization component, a presentation component, and/or other computer program components.

The video information component may be configured to obtain video information and/or other information. The video information may define spherical video content. The spherical video content may have a progress length. The spherical video content may include spherical video frames that define visual content viewable from a point of view as a function of progress through the progress length.

The viewing information component may be configured to obtain viewing information for the spherical video content and/or other information. The viewing information may define one or more trajectories of viewing directions for the spherical video content. A trajectory of viewing direction may include viewing directions from the point of view as the function of progress through the progress length.

In some implementations, the viewing directions from the point of view may be defined based on rotations about the point of view. The rotations about the point of view may include rotations about one or more axes running through the point of view. The axe(s) may include a yaw axis, a pitch axis, a roll axis, and/or other axes.

In some implementations, a trajectory of viewing directions may be defined based on a user's interaction with a display during presentation of the spherical video content on the display and/or other information.

The margin information component may be configured to obtain margin information and/or other information. The margin information may define one or more margin constraints. A margin constraint may limit deviations from a trajectory of viewing directions. In some implementations, the margin constraint may include a yaw axis constraint, a pitch axis constraint, a roll axis constraint, and/or other constraints. In some implementations, the margin constraint may include a target constraint and/or other constraints. The target constraint may be determined based on positions of a target in the spherical video frames and/or other information.

The stabilization component may be configured to determine stabilized viewing information based on the viewing information, the margin information, and/or other information. The stabilized viewing information may define one or more stabilized trajectories of viewing directions for the spherical video content. A stabilized trajectory of viewing directions may include stabilized viewing directions from the point of view as the function of progress through the progress length. Differences between a trajectory of viewing directions and a stabilized trajectory of viewing directions may be limited by the margin constraint(s). Changes in the stabilized viewing directions may be smoother than changes in the viewing directions.

In some implementations, determination of the stabilized viewing information based on the viewing information may include determining at least a portion of the stabilized trajectory of viewing directions based on a subsequent portion of the trajectory of viewing directions and/or other information. For example, the trajectory of viewing directions may include a first portion corresponding to a first moment within the progress length and a second portion corresponding to a second moment within the progress length. The second moment may be subsequent to the first moment. A portion of the stabilized trajectory of viewing directions corresponding to the first portion of the trajectory of viewing directions may be determined based on the second portion of the trajectory of viewing directions and/or other information.

The presentation component may be configured to present the spherical video content on a display based on the stabilized viewing information and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
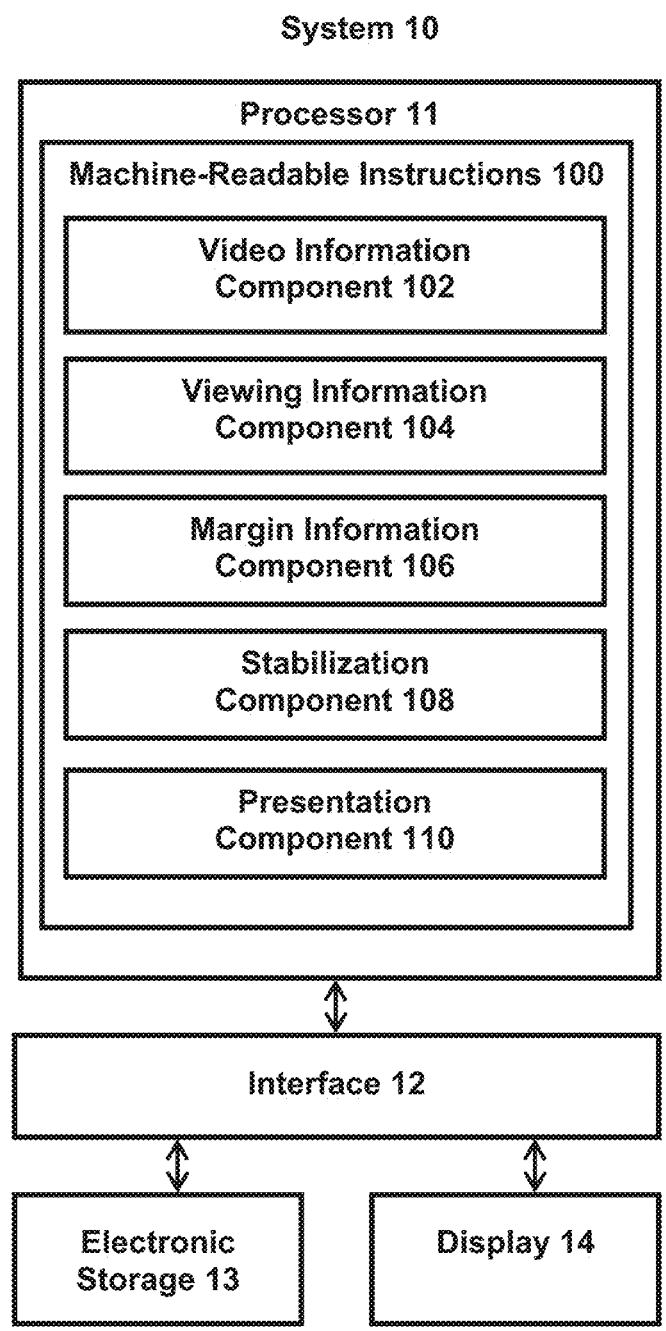
FIG. 1 illustrates a system that stabilizes views of videos.

FIG. 1 illustrates a system 10 for stabilizing views of videos. The system 10 may include one or more of a processor 11, an interface 12 (e.g., bus, wireless interface), an electronic storage 13, a display 14, and/or other components. Video information, viewing information for the spherical video content, margin information, and/or other information may be obtained by the processor 11. The video information may define spherical video content. The spherical video content may have a progress length and include spherical video frames that define visual content viewable from a point of view as a function of progress through the progress length. The viewing information for the spherical video content may define a trajectory of viewing directions for the spherical video content. The trajectory of viewing direction may include viewing directions from the point of view as the function of progress through the progress length. The margin information may define a margin constraint that limits deviations from the trajectory of viewing directions.

Stabilized viewing information may be determined by the processor based on the viewing information, the margin information, and/or other information. The stabilized viewing information may define a stabilized trajectory of viewing directions for the spherical video content. The stabilized trajectory of viewing directions may include stabilized viewing directions from the point of view as the function of progress through the progress length. Differences between the trajectory of viewing directions and the stabilized trajectory of viewing directions may be limited by the margin constraint and/or other information. The spherical video content may be presented on the display 14 based on the stabilized viewing information and/or other information.

The display 14 may include one or more devices that may present information visually. The display 14 may be configured to present video content (e.g., spherical video content) and/or other information. The display 14 may include one or more screens for presenting video content. For example, the display 14 may include a single screen in which the video content may be presented. As another example, the display 14 may include multiple screens in which the video content may be presented, with individual screens presenting portions of the video content. In some implementations, the display 14 may include a head-mounted display and the video content may be presented on the head-mounted display as virtual reality content. In some implementations, the display 14 may include a display of a mobile device (e.g., camera, smartphone, tablet, laptop).

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, video content (e.g., spherical video content), information relating to video content, viewing information, information relating to viewing directions, margin information, information relating to margin constraint, stabilized viewing information, information relating to stabilized viewing directions, and/or other information.

Video content may refer to media content that may be consumed as one or more videos/video clips. Video content may include one or more videos/video clips stored in one or more formats/containers, and/or other video content. A format may refer to one or more ways in which the information defining video content may be arranged/laid out (e.g., file format). A container may refer to one or more ways in which information defining video content may be arranged/laid out in association with other information (e.g., wrapper format). Video content may include a video clip captured by an image capture device, multiple video clips captured by an image capture device, and/or multiple video clips captured by different image capture devices. Video content may include multiple video clips captured at the same time and/or multiple video clips captured at different times. Video content may include a video clip processed by an image/video application, multiple video clips processed by an image/video application, and/or multiple video clips processed by different image/video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. That is, video content may include video frames that define visual content of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content. Spherical video content may include spherical video frames that define visual content viewable from a point of view as a function of progress through the progress length of the spherical video content.

Spherical video content may refer to a video capture of multiple views from a location. Spherical video content may include a full spherical video capture (360-degrees of capture, including opposite poles) or a partial spherical video capture (less than 360-degrees of capture). Spherical video content may be captured through the use of one or more image capture devices (e.g., cameras, image sensors) to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. A spherical video frame may include a spherical image of the spherical video content at a moment within the progress length of the spherical video content. For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor may be rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
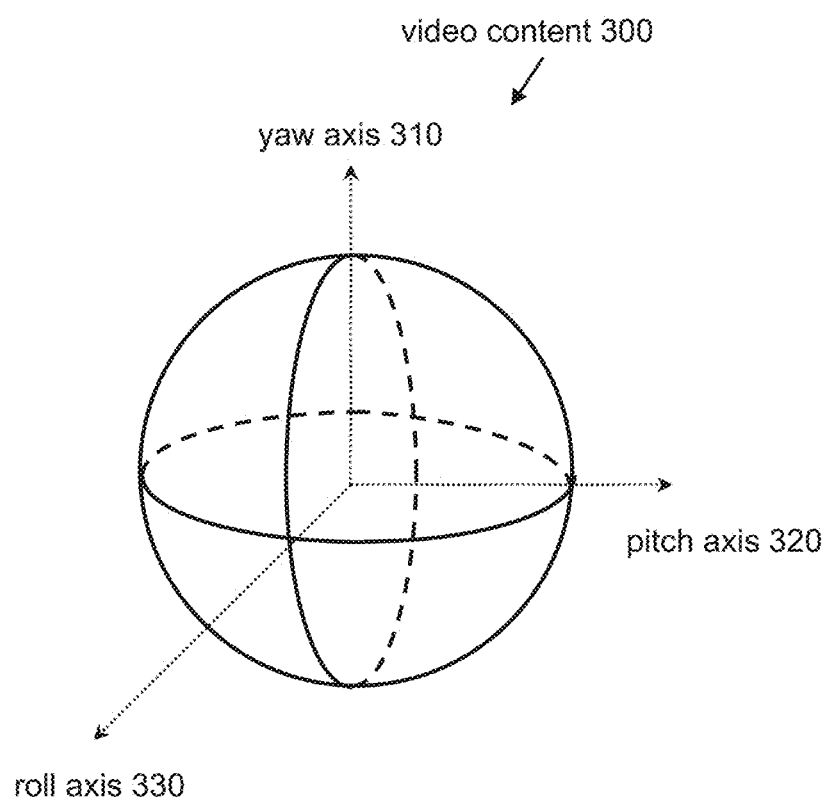
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the progress length of the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back-viewing direction. A −90-degree rotation of the video content 300 around the yaw axis 310 may correspond to a left viewing direction.

A 0-degree rotation of the video content 300 around the pitch axis 320 may correspond to a viewing direction that may be level with respect to horizon. A 45-degree rotation of the video content 300 around the pitch axis 320 may correspond to a viewing direction that may be pitched up with respect to horizon by 45-degrees. A 90-degree rotation of the video content 300 around the pitch axis 320 may correspond to a viewing direction that may be pitched up with respect to horizon by 90-degrees (looking up). A −45-degree rotation of the video content 300 around the pitch axis 320 may correspond to a viewing direction that may be pitched down with respect to horizon by 45-degrees. A −90-degree rotation of the video content 300 around the pitch axis 320 may correspond to a viewing direction that may be pitched down with respect to horizon by 90-degrees (looking down).

A 0-degree rotation of the video content 300 around the roll axis 330 may correspond to a viewing direction that may be upright. A 90-degree rotation of the video content 300 around the roll axis 330 may correspond to a viewing direction that may be rotated to the right by 90-degrees. A −90-degree rotation of the video content 300 around the roll axis 330 may correspond to a viewing direction that may be rotated to the left by 90-degrees. Other rotations and viewing directions are contemplated.

A playback of video content (e.g., the video content 300) may include presentation of one or more portions of the video content on one or more displays (e.g., the display 14) based on a viewing window and/or other information. The viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
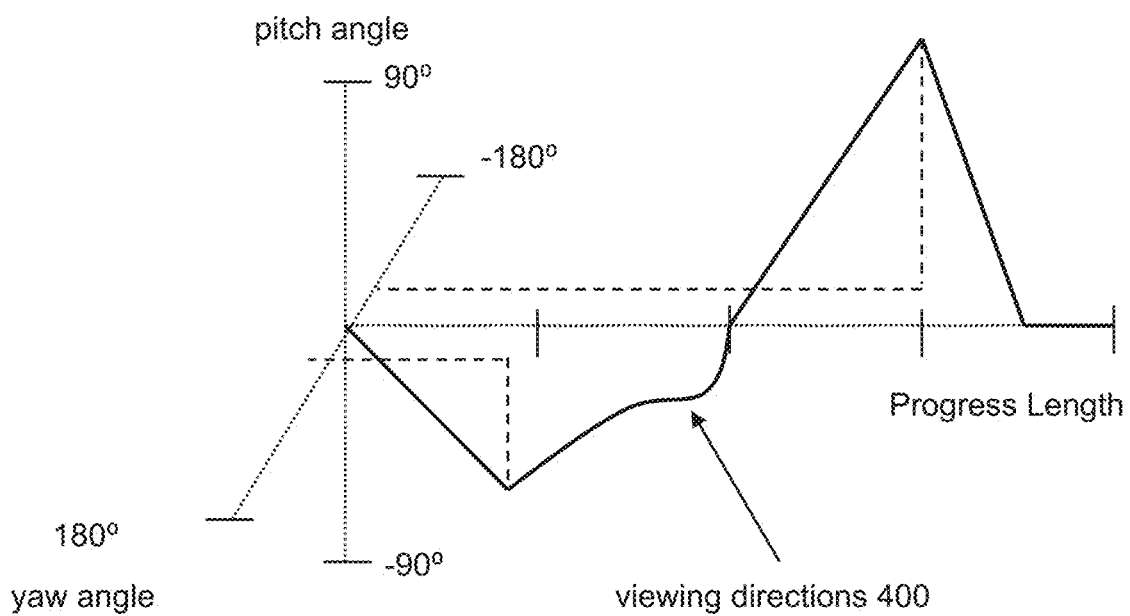
FIG. 4 illustrates example viewing directions for spherical video content.

For example, FIG. 4 illustrates example changes in viewing directions 400 (e.g., selected by a user for video content, specified by a director track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
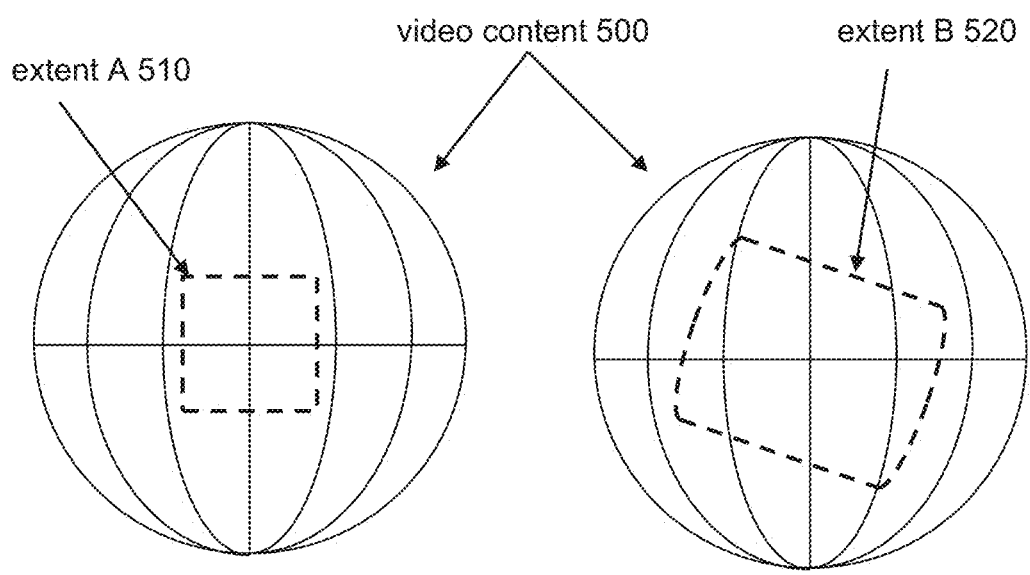
FIGS. 5A-5B illustrate example extents of spherical video content.

FIGS. 5A-5B illustrate examples of extents for video content 500. In FIG. 5A, the size of the viewable extent of the video content 500 may correspond to the size of extent A 510. In FIG. 5B, the size of viewable extent of the video content 500 may correspond to the size of extent B 520. Viewable extent of the video content 500 in FIG. 5A may be smaller than viewable extent of the video content 500 in FIG. 5B. The viewable extent of the video content 500 in FIG. 5B may be more tilted with respect to the video content 500 than viewable extent of the video content 500 in FIG. 5A. Other viewing sizes and viewing rotations are contemplated.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing views of videos. The machine-readable instructions 100 may include one or more computer program components. The machine-readable instructions 100 may include one or more of a video information component 102, a viewing information component 104, a margin information component 106, a stabilization component 108, a presentation component 110, and/or other computer program components.

The video information component 102 may be configured to obtain video information defining one or more video content (e.g., spherical video content) and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information component 102 may obtain video information based on user interaction with a user interface/application (e.g., video editing application), and/or other information. For example, a user interface/application may provide option(s) for a user to select one or more video content in which views are to be stabilized. The video information defining the video content may be obtained based on the user's selection of the video content through the user interface/video application. Other selections of video content are contemplated.

In some implementations, one or more corrections may be applied to the video content. A correction may refer to a process that changes one or more visual and/or audio characteristics of the video content. A correction may be applied to the entire progress length of the video content, a portion of the progress length of the video content, the entire visual extent of the video content, or a portion of the visual extent of the video content. For example, a rotation/horizontal correction may be applied to video content to stabilize the video content. For instance, the video content may have been captured while the image capture device(s) capturing the video content was rotated with respect to the horizon. Such capture of the video content may result in a view of the video content showing rotated (e.g., tilted) view of the captured content. The video content may be corrected for such rotation during capture such that the video content is stabilized about the horizon.

As another example, a rolling shutter correction may be applied to video content. For instance, the video content may have been captured using rolling shutter where pixels of the video frames of the video content are captured on a row-by-row basis. Such capture of video content may result in one or more rolling shutter effects in the video content, such as wobble, skew, spatial aliasing, temporal aliasing, and/or other rolling shutter effects. The video content may be corrected for rolling shutter capture such that one or more rolling shutter effects are removed from the video content. Application of other corrections to the video content are contemplated.

The viewing information component 104 may be configured to obtain viewing information for the video content (e.g., spherical video content) and/or other information. Obtaining viewing information may include one or more of accessing, acquiring, analyzing, determining, examining, identifying, loading, locating, opening, receiving, retrieving, reviewing, storing, and/or otherwise obtaining the viewing information. The viewing information component 104 may obtain viewing information from one or more locations. For example, the viewing information component 104 may obtain viewing information from a storage location, such as the electronic storage 13, electronic storage of information and/or signals generated by one or more sensors, electronic storage of a device accessible via a network, and/or other locations. The viewing information component 104 may obtain viewing information from one or more hardware components and/or one or more software components (e.g., software running on a computing device).

The viewing information may define one or more trajectories of viewing directions for the video content (e.g., spherical video content). A trajectory of viewing directions may refer to a line, a path, and/or a progression that defines values of viewing directions for the video content as a function of progress through the progress length of the video content. That is, the trajectory of viewing directions may be formed by and/or define values of viewing directions to be used when the video content is viewed, such as values of viewing directions defined in a director track that includes information as to how the video content is to be presented on a display (e.g., the display 14). For instance, a trajectory of viewing direction may include viewing directions from a point of view of spherical video content as the function of progress through the progress length of the spherical video content.

The viewing directions from a point of view for video content may be defined based on rotations about the point of view. The rotations about the point of view may include rotations about one or more axes running through the point of view. The axe(s) may include a yaw axis, a pitch axis, a roll axis, and/or other axes. For example, the axe(s) may include one or more of the yaw axis 310, the pitch axis 320, and/or the roll axis 330 shown in FIG. 3. An example viewing directions 400 defined based on rotations about multiple axes is shown in FIG. 4. Other trajectories of viewing directions are contemplated. In some implementations, the viewing information may define other values for one or more parameters of a viewing window for the video content, such as viewing size and/or viewing rotation. That is, viewing information may define one or more trajectories of viewing sizes and/or viewing rotations for the video content. Thus, viewing information may define one or more parameters by which a viewing window for the video content may be determined. The viewing information may define one or more of the direction at which the video content is viewed (viewing direction), the extent of the visual content of the video content that is within the viewing window (viewing size), and/or the rotation of the viewing window (viewing rotation).

In some implementations, a trajectory of viewing directions, viewing sizes, and/or viewing rotations may be defined based on a user's interaction with a display during presentation of the video content (e.g., spherical video content) on the display and/or other information. That is, a user may define parameters (e.g., viewing direction, viewing size, viewing rotation) of a viewing window for video content by interacting with the display during presentation of the video content. A user's interaction with the display may include the user's engagement with the display (e.g., user's engagement with a touchscreen display) and/or a user's engagement with a device including and/or coupled to the display (e.g., user's engagement with a mobile device including the display).

Figure 6:
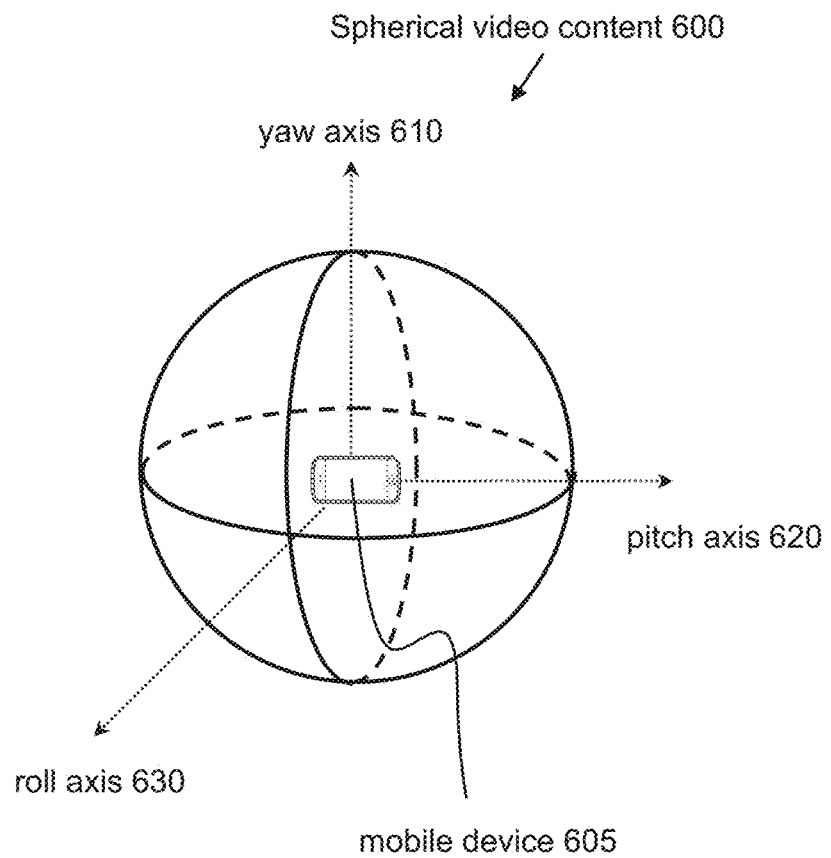
FIG. 6 illustrates an example mobile device for determining viewing information for spherical video content.

For example, FIG. 6 illustrates an example mobile device 605. A trajectory of viewing directions, viewing sizes, and/or viewing rotations for video content may be defined based on a user's interaction with the mobile device 605 during presentation of the video content on the display of the mobile device 605. For example, the mobile device 605 may include one or more motion/rotation sensors (e.g., accelerometer, gyroscope, inertial measurement unit, magnetometer) and the user's interaction with the display may include the user moving the mobile device 605 rotationally and/or transversally. For example, the user may move the mobile device 605 laterally to change the viewing direction for the video content in a lateral direction. The user may rotate the mobile device 605 about the yaw axis 610 and/or the pitch axis 620 to change the viewing direction for the video content in the direction of rotation (e.g., rotating to the right, rotating to the left, pitch-up, pitch-down). The user may rotate the mobile device 605 (e.g., tilt to the right, tilt to the left) to change the viewing rotation for the video content.

The user may move the mobile device forward or back to change the viewing size for the video content (e.g., zoom in or zoom out).

As another example, the mobile device 605 may include a touchscreen display, and the user may define a trajectory of viewing directions, viewing sizes, and/or viewing rotations for video content by interacting with the touchscreen display during presentation of the video content on the touchscreen display. The user's interaction with the touchscreen display may include the user's engagement with the touchscreen display to make one or more gestures on the touchscreen display. For instance, the user may make one or more panning gestures, one or more rotating gestures, one or more stretching gestures, one or more pinching gestures, and/or other gestures on the touchscreen display. The gesture (s) on the touchscreen display may define values for viewing directions, viewing sizes, and/or viewing rotations. For example, a panning gesture may change the viewing direction for the video content in a lateral direction (e.g., to the left, to the right, around yaw axis). The rotating gesture may change the viewing rotation for the video content in a clockwise or anti-clockwise direction. The stretching gesture may change the viewing size for the video content by zooming in on the portion of the video content in the middle of the stretching gesture. The pinching gesture may change the viewing size for the video content by zooming out of the video content (e.g., zooming out from the portion of the video content in the middle of the pinching gesture).

A trajectory of viewing directions, viewing sizes, and/or viewing rotations defined based on a user's interaction with a display during presentation of the video content may be used to create a custom view for the video content. That is, the values of the viewing directions, viewing sizes, and/or viewing rotations defined based on the user's interaction may be stored and used to present a particular view of the video content on playback. For example, a user's interaction with a display may define a trajectory of viewing directions 400 shown in FIG. 4. The values of the rotations about the yaw axis and the pitch axis in the viewing directions may be stored in a director track. The director track may be used to determine in what direction a viewing window for the video content should be directed when the video content is played. The director track may define other values for determining a viewing window for the video content, such as viewing sizes and/or viewing rotations. Different user interactions may be used to generate different director tracks. Different director tracks may be used to provide different views of the video content. For instance, different director tracks defining different viewing directions may provide views with different styles (e.g., dynamic style view, calm style view).

Using a user's interaction with a display to define viewing directions, viewing sizes, and/or viewing rotations for video content may result in unsmooth views of the video content. For example, a user's movement/rotation of the mobile device 605 may result in high frequency noise in the viewing directions, such as based on the user's hand(s) holding the mobile device 605 shaking. As another example, a user's movement/rotation of the mobile device 605 may result in abrupt changes in the viewing directions that result in a jerky/shaky view of the video content. That is, due to unsmooth motion of the user in moving/rotating the mobile device 605, the changes in viewing directions for the video content may include stagger, jitter, and/or other jerk in change. Other user interactions are contemplated.

Figure 7:
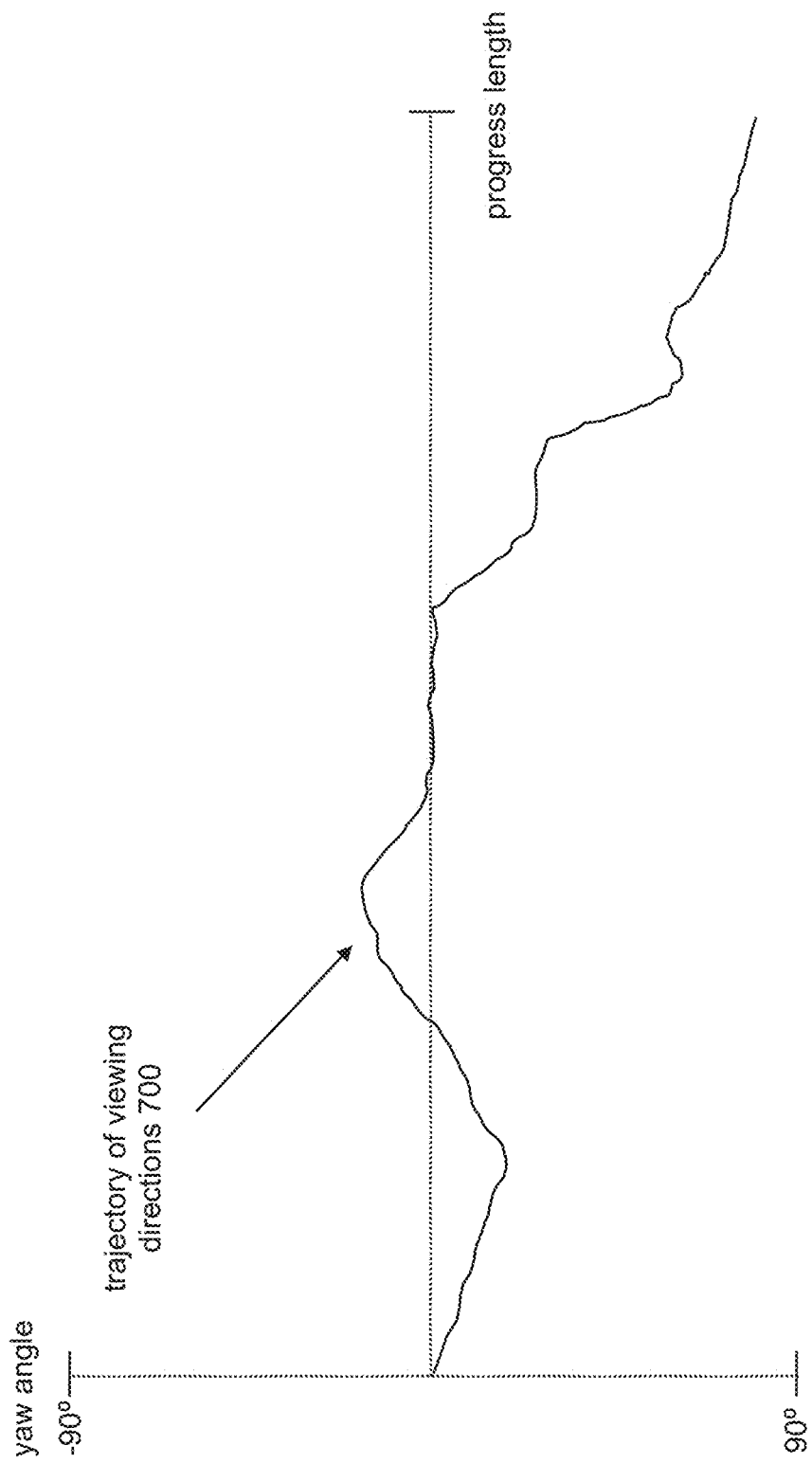
FIG. 7 illustrates an example trajectory of viewing directions for video content.

For example, FIG. 7 illustrates an example trajectory of viewing directions 700 for video content. The trajectory of viewing directions 700 may be defined based on a user's interaction with a display during presentation of the video content on the display. The trajectory of viewing directions 700 may define values of yaw angle positions (e.g., rotational positions defined with respect to a yaw axis, rotation to the left or right) at which a viewing window for the video content was directed during playback of the video content. For example, the trajectory of viewing directions 700 may be defined based on the display being rotated in a negative yaw direction, rotated in a positive yaw direction, rotated near a zero-yaw direction, and then rotated in the negative yaw direction. Other types of trajectory of viewing directions are contemplated.

Presenting a view of the video content based on the trajectory of viewing directions 700 may be undesirable. For example, presenting a view of the video content based on the trajectory of viewing directions 700 may result in a view that is shaky and/or that appears to include unintended camera motion. For instance, sharp/quick changes in the yaw angle positions in the trajectory of viewing directions 700 may result in abrupt changes in the direction of visuals within the video (e.g., quick left or right virtual camera motion). Multiple changes in the yaw angle positions in the trajectory of viewing directions 700 may result in a view that is repeatedly changing the direction of view (e.g., to the right, to the left, to the front, to the right) and/or not providing a stabilized view of the video content.

The margin information component 106 may be configured to obtain margin information and/or other information. Obtaining margin information may include one or more of accessing, acquiring, analyzing, determining, examining, identifying, loading, locating, opening, receiving, retrieving, reviewing, storing, and/or otherwise obtaining the margin information. The margin information component 106 may obtain margin information from one or more locations. For example, the margin information component 106 may obtain margin information from a storage location, such as the electronic storage 13, electronic storage of information and/or signals generated by one or more sensors, electronic storage of a device accessible via a network, and/or other locations. The margin information component 106 may obtain margin information from one or more hardware components and/or one or more software components (e.g., software running on a computing device).

The margin information may define one or more margin constraints. A margin constraint may refer to one or more constraints by which a trajectory of viewing directions, viewing sizes, and/or viewing rotations may be changed. A margin constraint may provide one or more ranges of margin with which a trajectory of viewing directions, viewing sizes, and/or viewing rotations may be changed. For example, a margin constraint may limit deviations from a trajectory of viewing directions, such as the trajectory of viewing directions 700 shown in FIG. 7. The margin constraint may limit how much the trajectory of viewing directions may be stabilized to provide a more stable view of the video content. That is, the margin constraint may limit deviations of a stabilized trajectory of viewing directions from the trajectory of viewing directions. A stabilized trajectory of viewing directions may include smoother/more stable changes in viewing directions than the trajectory of viewing directions from which it may be generated. A stabilized trajectory of viewing sizes and/or viewing rotations may include smoother/more stable changes in viewing sizes and/or viewing rotation than the trajectory from which it may be generated.

The margin constraint may provide one or more margins to limit how much the values of the stabilized trajectory may differ from the values of the original trajectory. Such margin(s) may preserve the intention of the user in changing the parameters (e.g., viewing directions, viewing sizes, viewing rotations) for viewing video content while removing jitters, stagger, and/or other jerky motions (e.g., removing high-frequency vibrations).

Figure 8:
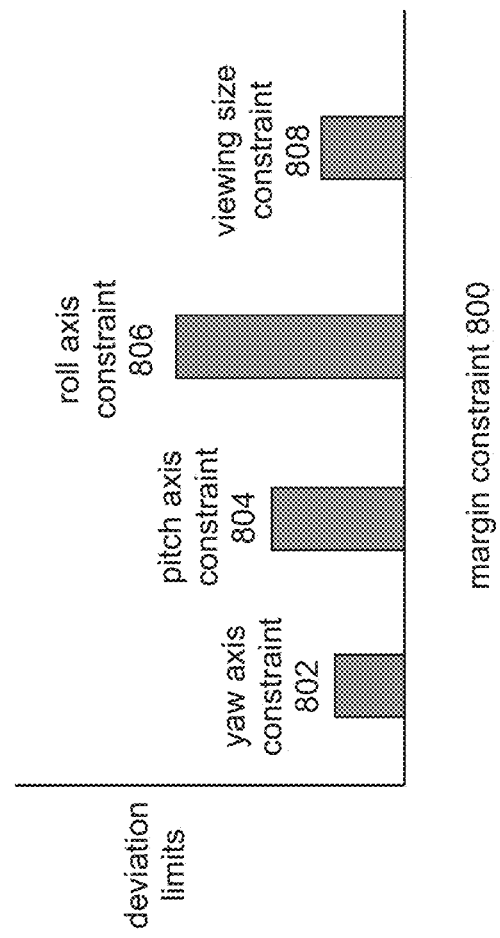
FIG. 8 illustrates an example margin constraint.

A margin constraint may provide the same or different deviation limits on the values of the trajectory of viewing directions, viewing sizes, and/or viewing rotations. For example, FIG. 8 illustrates an example margin constraint 800 including different deviation limits for different parameters of a viewing window for video content. The margin constraint 800 may include a yaw axis constraint 802, a pitch axis constraint 804, a roll axis constraint 806, and a viewing size constraint 808. The yaw axis constraint 802 and the pitch axis constraint 804 may limit the amount of deviations with respect to the change in viewing directions for the stabilized trajectory of viewing directions. The roll axis constraint 806 may limit the amount of deviations with respect to the change in viewing rotations for the stabilized trajectory of viewing rotations (or a portion of the stabilized trajectory of viewing directions). The viewing size constraint 808 may limit the amount of deviations with respect to the change in viewing sizes for the stabilized trajectory of viewing sizes.

The margin constraint 800 may provide for different deviation limits with the yaw axis constraint 802, the pitch axis constraint 804, the roll axis constraint 806, and the viewing size constraint 808. For example, determination of the stabilized trajectory of viewing directions based on the margin constraint 800 may allow for greater deviation in the roll of a viewing direction then the yaw of the viewing direction. Determination of the stabilized trajectory based on the margin constraint 800 may allow for greater changes of the viewing rotation than the viewing size of the viewing window. Use of such a margin constraint may allow for different stabilization of the viewing directions, viewing sizes, and/or viewing rotations. Higher margins may enable greater stabilization of a view for video content while lower margins may more closely preserve the user interaction that defined the original view for the video content. In some implementations, different margin constraints may be used to provide different styles of view. For example, a margin constraint with low margins may be used to provide a very stabilized view of video content while a margin constraint with high margins may be used to provide a slightly stabilized view of video content. As another example, a margin constraint with different limits on different parameters may be provided to create different styles of view of video content, such as one view that greatly stabilizes viewing rolls while allow for large fluctuations in viewing sizes. In some implementations, different margin constraint may be used for different styles of view (e.g., active view, scenery view). In some implementations, different margin constraint may be used for different content captured within the video content (e.g., sporting event, music festival, third-person view capture, first-person view capture).

In some implementations, the margin constraint may include a target constraint and/or other constraints. A target constraint may provide limit the amount of deviations with respect to the change in viewing directions, viewing sizes, and/or viewing rotations based on the presence of target within the video content. For example, the target constraint may be determined based on positions of a target in spherical video frames and/or other information such that a stabilized viewing window includes the target or a portion of the target. For example, the target constraint may define how far stabilized viewing directions may be changed from the original viewing directions such that the stabilized viewing windows stays directed at the target. The target constraint may define how much stabilized viewing sizes may be changed from the original viewing sizes such that the stabilized viewing window includes all of or certain portion(s) of the target and/or certain amount of area surrounding the target. The target constraint may define how much stabilized viewing rotations may be changed from the original viewing rotations such that the stabilized viewing window stays level with the target or the environment of the target. Other constraints are contemplated.

The stabilization component 108 may be configured to determine stabilized viewing information based on the viewing information, the margin information, and/or other information. The stabilized viewing information may define one or more stabilized trajectories of viewing directions, viewing sizes, and/or viewing rotations for the video content (e.g., spherical video content). The stabilization component 108 may determine the stabilized viewing information based on the viewing information to stabilize (e.g., smooth) the trajectory characterized by the viewing information. That is, the stabilized trajectory defined by the stabilized viewing information may be a stabilized version of the trajectory defined by the viewing information. For example, a stabilized trajectory of viewing directions may include stabilized viewing directions from the point of view as the function of progress through the progress length of video content (e.g., spherical video content). Differences between a trajectory of viewing directions and a stabilized trajectory of viewing directions may be limited by the margin constraint(s). Changes in the stabilized viewing directions may be smoother than changes in the viewing directions. For example, jitters in the trajectory of viewing directions, viewing sizes, and/or viewing rotations may be removed in the stabilized trajectory. As another example, an abrupt jump in the trajectory of viewing directions, viewing sizes, and/or viewing rotations may be replaced in the stabilized trajectory with a linear/curved ramp to provide for a smoother changes in the viewing directions, viewing sizes, and/or viewing rotations.

In some implementations, the stabilization component 108 may determine different stabilized viewing information based on different margin information (different margin constraints). For example, the stabilization component 108 may determine different stabilized trajectory of viewing directions based on different margin constraints to create different views/styles of views of the video content.

Figure 9:
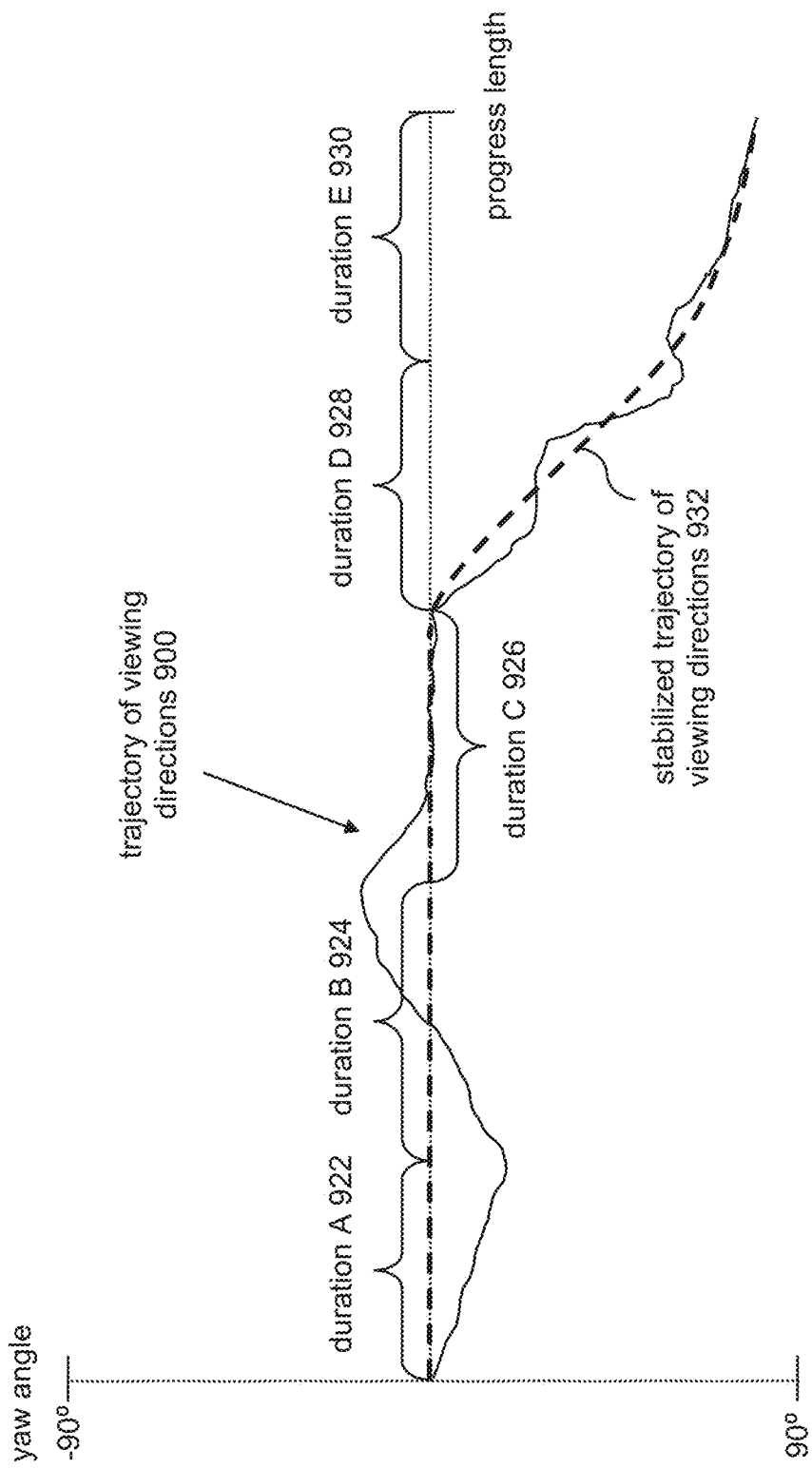
FIG. 9 illustrates example trajectory of viewing direction and stabilized trajectory of viewing directions.

FIG. 9 illustrates example trajectory of viewing direction 900 and stabilized trajectory of viewing directions 932. The trajectory of viewing directions 700 may define values of yaw angle positions (e.g., rotational positions defined with respect to a yaw axis, rotation to the left or right) at which a viewing window for the video content was directed during playback of the video content. The stabilized trajectory of viewing directions 932 may be determined such that changes in the stabilized viewing directions of the stabilized trajectory of viewing directions 932 are smoother than changes in the viewing directions of the trajectory of viewing directions 900.

In some implementations, determination of the stabilized viewing information based on the viewing information may include determining at least a portion of the stabilized trajectory of viewing directions, viewing sizes, and/or viewing rotations based on a subsequent portion of the trajectory of viewing directions, viewing sizes, and/or viewing rotations (look ahead), and/or other information. For example, stabilizing a portion of a trajectory of viewing directions based on a subsequent portion of the trajectory of viewing directions may including stabilizing a portion of the viewing directions corresponding to a given moment within the progress length based on one or more portions of the viewing directions corresponding to one or more subsequent moments (moment(s) past the given moment) within the progress length.

A subsequent moment within the progress length may be adjacent to the given moment or not adjacent to the given moment. Using the subsequent portion(s) of the trajectory (look ahead) to stabilize the trajectory may enable the stabilization component 108 to determine stabilized viewing information that preserves a user's intended changes in the viewing window. The user's intended changes in the viewing window may refer to changes in the extents defined by the viewing window that the user planned/meant to carry out, such as intentional changes in the viewing directions, viewing sizes, and/or viewing rotations.

For example, the trajectory of viewing directions 900 may include portions corresponding to different moments within the progress length, such as a duration A 922, a duration B 924, a duration C 926, a duration D 928, and a duration E 930. One or more portions of the trajectory of viewing directions 900 may be stabilized (e.g., as shown in the stabilized trajectory of viewing direction 932) based on subsequent portion(s) of the trajectory of viewing directions 900. For instance, one or more portions of the trajectory of viewing directions 900 in the "future" may be used to determine whether a particular change in the viewing directions defined by the trajectory of viewing directions 900 was an intended change or an unintended change. For example, changes in the trajectory of viewing directions 900 may include a negative change in yaw angle below zero-yaw degree during the duration A 922, followed by a positive change in yaw angle past zero-yaw degree during the duration B 924, followed by a negative change in yaw angle to zero-yaw degree during the duration C 926. Such fluctuation of the trajectory of viewing directions 900 around the zero-yaw degree may indicate that the initial negative change in the viewing directions was not intended, that the positive change in the viewing directions was meant to correct for the preceding unintended motion, that the user overshot the correction to go past the zero-yaw degree before arriving at the zero-yaw degree.

The stabilized trajectory of viewing directions 932 during the duration A 922 may be determined based on the portion of the trajectory of viewing directions 900 corresponding to the duration B 924 and/or the duration C 926, and the stabilized trajectory of viewing directions 932 during the duration B 924 may be determined based on the portion of the trajectory of viewing directions 900 corresponding to the duration C 926 such that the unintended motion during duration A 922 and the duration B 924 are removed in the stabilized trajectory of viewing directions 932. Similarly, based on a subsequent portion of the trajectory of viewing directions 900 corresponding to the duration E 930, the portion of the stabilized trajectory of viewing direction 932 for the duration D 928 may be determined to include smooth changes from the zero-yaw degree to negative yaw degree. Other stabilization of trajectory of viewing directions, viewing sizes, and/or viewing rotations based on a subsequent portion of the trajectory of viewing directions, viewing sizes, and/or viewing rotations are contemplated.

The presentation component 110 may be configured to present the video content (e.g., spherical video content) on one or more displays (e.g., the display 14) based on the stabilized viewing information and/or other information. For example, based on stabilized trajectory of viewing directions (such as shown in FIG. 9), particular extents of the video content may be presented on a display (e.g., the display 14). Such presentation of the video content may provide for a stabilized view of the video content.

The presentation of the video content based on the stabilized viewing information may be provided as a "default" or "automatic" view for the video content. That is, rather than presenting the video content based on the viewing information, the video content may be presented based on the stabilized viewing information. Such presentation of the video content may make the users think and/or believe that they created the stabilized view of the video content, rather than that they created the (unsmoothed) view of the video content which was stabilized by the stabilization component 110. In some implementations, multiple views of the video content may be presented based on different stabilized viewing information. For example, different stabilized viewing information may define different stabilization of trajectory of viewing directions, viewing sizes, and/or viewing rotations to create different styles of view. The different styles of view of the video content may be presented for selection by a user.

In some implementations, the presentation component 110 may be configured to generate one or more video edits of the video content. A video edit may refer to a particular arrangement and/or manipulation of one or more portions (e.g., video clips) of the video content. A video edit, such as a video summary, may include portion(s) of the video content to provide an overview of the video content. A video edit may include extents of the video content defined by stabilized trajectory of viewing directions, viewing sizes, and/or viewing rotations. That is, the presentation component 110 may generate a video edit of the video content based on the stabilized viewing information.

Stabilized viewing information and/or other information defining stabilized trajectory may be stored in one or more storage media. For example, the stabilized viewing information may be stored in the electronic storage 13, remote storage locations (storage media located at/accessible through a server), and/or other locations. In some implementations, the stabilized viewing information may be stored through one or more intermediary devices. For example, the processor 11 may be located within a computing device without a connection to the storage device (e.g., the computing device lacks WiFi/cellular connection to the storage device). The stabilized viewing information may be stored through another device that has the necessary connection (e.g., the computing device using a WiFi/cellular connection of a paired mobile device, such as a smartphone, tablet, laptop, to store information in one or more storage media). Other storage locations for and storage of the stabilized viewing information are contemplated.

While the description herein may be directed to video content, one or more other implementations of the system/method described herein may be configured for other types media content. Other types of media content may include one or more of audio content (e.g., music, podcasts, audiobooks, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While computer program components are described herein as being implemented via the processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
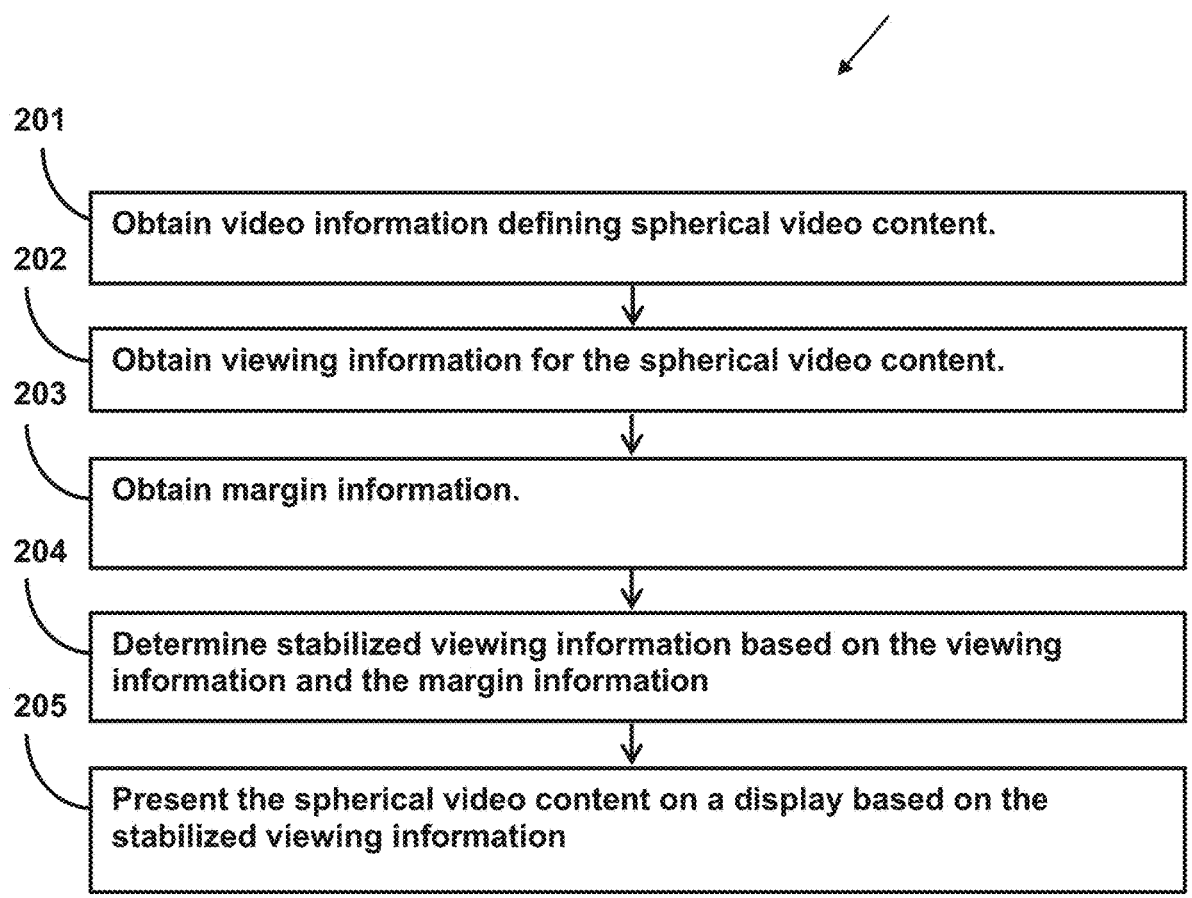
FIG. 2 illustrates a method for stabilizing views of videos.

FIG. 2 illustrates method 200 for stabilizing views of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information may be obtained. The video information may define spherical video content. The spherical video content may have a progress length. The spherical video content may include spherical video frames. The spherical video frames may define visual content viewable from a point of view as a function of progress through the progress length. In some implementations, operation 201 may be performed by a processor component the same as or similar to the video information component 102 (Shown in FIG. 1 and described herein).

At operation 202, viewing information for the spherical video content may be obtained. The viewing information may define a trajectory of viewing directions for the spherical video content. The trajectory of viewing direction may include viewing directions from the point of view as the function of progress through the progress length. In some implementations, operation 202 may be performed by a processor component the same as or similar to the viewing information component 104 (Shown in FIG. 1 and described herein).

At operation 203, margin information may be obtained. The margin information may define a margin constraint that limits deviations from the trajectory of viewing directions. In some implementations, operation 203 may be performed by a processor component the same as or similar to the margin information component 106 (Shown in FIG. 1 and described herein).

At operation 204, stabilized viewing information may be determined based on the viewing information and the margin information. The stabilized viewing information may define a stabilized trajectory of viewing directions for the spherical video content. The stabilized trajectory of viewing directions may include stabilized viewing directions from the point of view as the function of progress through the progress length. Differences between the trajectory of viewing directions and the stabilized trajectory of viewing directions may be limited by the margin constraint. In some implementations, operation 204 may be performed by a processor component the same as or similar to the stabilization component 108 (Shown in FIG. 1 and described herein).

At operation 205, the spherical video content may be presented on a display based on the stabilized viewing information. In some implementations, operation 205 may be performed by a processor component the same as or similar to the presentation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method of stabilized viewing of video content, comprising:

obtaining a video having a progress length, wherein the video has been previously captured;

obtaining a trajectory of viewing direction of a viewing window for the video, the trajectory of viewing direction of the viewing window including viewing directions of the viewing window for moments within the progress length of the video, the viewing directions of the viewing window characterized by rotations about different axes;

stabilizing the trajectory of viewing direction of the viewing window for the video to generate a stabilized trajectory of viewing direction of the viewing window for the video, wherein the stabilized trajectory of viewing direction of the viewing window for the video includes the trajectory of viewing direction of the viewing window for the video that is differently stabilized for the different axes of rotation for the viewing directions of the viewing window; and generating a stabilized video based on the stabilized viewing trajectory of viewing direction of the viewing window for the video.

2. The method of claim 1, wherein the trajectory of viewing direction of the viewing window is identified by a user as a function of progress through the progress length of the video.

3. The method of claim 2, wherein the trajectory of viewing direction of the viewing window is identified by the user via user interaction with a touchscreen display.

4. The method of claim 2, wherein the trajectory of viewing direction of the viewing window is identified by the user via user rotation of a mobile device.

5. The method of claim 1, wherein the stabilized trajectory of viewing direction of the viewing window is generated by smoothing jerkiness or shakiness in the trajectory of viewing direction of the viewing window.

6. The method of claim 1, wherein the different axes of rotation for the viewing directions of the viewing window include a yaw axis, a pitch axis, and a roll axis.

7. The method of claim 6, wherein the trajectory of viewing direction of the viewing window for the video being differently stabilized for the different axes of rotation for the viewing directions of the viewing window includes stabilization of the trajectory of viewing direction of the viewing window for the video about one of the yaw axis, the pitch axis, or the roll axis being different from stabilization of the trajectory of viewing direction of the viewing window for the video about another of the yaw axis, the pitch axis, and the roll axis.

8. The method of claim 7, wherein the stabilized trajectory of viewing direction of the viewing window for the video is generated further based on a viewing size constraint of the viewing window.

9. The method of claim 8, wherein the viewing size constraint of the viewing window limits deviation of a viewing size of the viewing window associated with the stabilized trajectory of viewing direction of the viewing window from a viewing size of the viewing window associated with the trajectory of viewing direction of the viewing window.

10. A system for stabilizing viewing of video content, comprising:

one or more physical processors configured by machine-readable instructions to:

obtain a video having a progress length, wherein the video has been previously captured;

obtain a trajectory of viewing direction of a viewing window for the video, the trajectory of viewing direction of the viewing window including viewing directions of the viewing window for moments within the progress length of the video, the viewing directions of the viewing window characterized by rotations about different axes;

stabilize the trajectory of viewing direction of the viewing window for the video to generate a stabilized trajectory of viewing direction of the viewing window for the video, wherein the stabilized trajectory of viewing direction of the viewing window for the video includes the trajectory of viewing direction of the viewing window for the video that is differently stabilized for the different axes of rotation for the viewing directions of the viewing window; and generate a stabilized video based on the stabilized viewing trajectory of viewing direction of the viewing window for the video.

11. The system of claim 10, wherein the trajectory of viewing direction of the viewing window is identified by a user as a function of progress through the progress length of the video.

12. The system of claim 11, wherein the trajectory of viewing direction of the viewing window is identified by the user via user interaction with a touchscreen display.

13. The system of claim 11, wherein the trajectory of viewing direction of the viewing window is identified by the user via user rotation of a mobile device.

14. The system of claim 10, wherein the stabilized trajectory of viewing direction of the viewing window is generated by smoothing jerkiness or shakiness in the trajectory of viewing direction of the viewing window.

15. The system of claim 10, wherein the different axes of rotation for the viewing directions of the viewing window include a yaw axis, a pitch axis, and a roll axis.

16. The system of claim 15, wherein the trajectory of viewing direction of the viewing window for the video being differently stabilized for the different axes of rotation for the viewing directions of the viewing window includes stabilization of the trajectory of viewing direction of the viewing window for the video about one of the yaw axis, the pitch axis, or the roll axis being different from stabilization of the trajectory of viewing direction of the viewing window for the video about another of the yaw axis, the pitch axis, and the roll axis.

17. The system of claim 16, wherein the stabilized trajectory of viewing direction of the viewing window for the video is generated further based on a viewing size constraint of the viewing window.

18. The system of claim 17, wherein the viewing size constraint of the viewing window limits deviation of a viewing size of the viewing window associated with the stabilized trajectory of viewing direction of the viewing window from a viewing size of the viewing window associated with the trajectory of viewing direction of the viewing window.

19. A system for stabilizing viewing of video content, comprising:

one or more physical processors configured by machine-readable instructions to:
obtain a video having a progress length, wherein the video has been previously captured;
obtain a trajectory of viewing direction of a viewing window for the video, the trajectory of viewing direction of the viewing window including viewing directions of the viewing window for moments within the progress length of the video, the viewing directions of the viewing window characterized by rotations about different axes, wherein the different axes of rotation for the viewing directions of the viewing window include a yaw axis, a pitch axis, and a roll axis;
stabilize the trajectory of viewing direction of the viewing window for the video by smoothing jerkiness or shakiness in the trajectory of viewing direction of the viewing window to generate a stabilized trajectory of viewing direction of the viewing window for the video, wherein the stabilized trajectory of viewing direction of the viewing window for the video includes the trajectory of viewing direction of the viewing window for the video that is differently stabilized for the different axes of rotation for the viewing directions of the viewing window, wherein the trajectory of viewing direction of the viewing window for the video being differently stabilized for the different axes of rotation for the viewing directions of the viewing window includes stabilization of the trajectory of viewing direction for the video about one of the yaw axis, the pitch axis, or the roll axis being different from stabilization of the trajectory of viewing direction of the viewing window for the video about another of the yaw axis, the pitch axis, and the roll axis; and
generate a stabilized video based on the stabilized viewing trajectory of viewing direction of the viewing window for the video.

20. The system of claim 19, wherein the trajectory of viewing direction of the viewing window is identified by a user as a function of progress through the progress length of the video via user interaction with a touchscreen display or user rotation of a mobile device.

* * * * *